(12) United States Patent
Fabian et al.

(10) Patent No.: US 9,456,089 B2
(45) Date of Patent: Sep. 27, 2016

(54) METHOD AND RECEIVING UNIT FOR SYNCHRONIZING A PACKET-ORIENTED RECEPTION WITH A CALCULATED TONE SIGNAL

(75) Inventors: Thomas Fabian, Giesshubl (AT); Wolfgang Bauer, Wien (AT)

(73) Assignee: Unify GmbH & Co. KG, Munich (DE)

( * ) Notice: Subject to any disclaimer, the term of this patent is extended or adjusted under 35 U.S.C. 154(b) by 1601 days.

(21) Appl. No.: 12/747,667

(22) PCT Filed: Dec. 8, 2008

(86) PCT No.: PCT/EP2008/066984
§ 371 (c)(1),
(2), (4) Date: Aug. 17, 2010

(87) PCT Pub. No.: WO2009/077364
PCT Pub. Date: Jun. 25, 2009

(65) Prior Publication Data
US 2010/0329286 A1    Dec. 30, 2010

(30) Foreign Application Priority Data

Dec. 19, 2007    (DE) .................. 10 2007 061 312

(51) Int. Cl.
*H04J 3/06* (2006.01)
*H04M 7/12* (2006.01)
(Continued)

(52) U.S. Cl.
CPC .......... *H04M 7/1295* (2013.01); *H04L 65/607* (2013.01); *H04L 65/608* (2013.01); *H04N 1/00217* (2013.01); *H04N 1/00214* (2013.01); *H04N 2201/0015* (2013.01)

(58) Field of Classification Search
None
See application file for complete search history.

(56) References Cited

U.S. PATENT DOCUMENTS

| 7,233,605 B1 | 6/2007 | Oran |
| 2006/0077987 A1 | 4/2006 | Qi et al. |
| 2006/0083220 A1 | 4/2006 | Mekala et al. |

FOREIGN PATENT DOCUMENTS

| DE | 102005008049 A1 | 8/2006 |
| EP | 0946034 A2 | 9/1999 |

(Continued)

OTHER PUBLICATIONS

Schulzrinne H., "RTP Payload for DTMF Digits, Telephony Tones and Telephony Signals", IETF, May 2000, pp. 1-27.
(Continued)

*Primary Examiner* — John Blanton
*Assistant Examiner* — Alan Lindenbaum
(74) *Attorney, Agent, or Firm* — Buchanan Ingersoll & Rooney PC

(57) ABSTRACT

In addition to the transmission of a tone signal (ts) according to the RFC standard 2833 via a network using Internet protocol, the tone signal is transmitted in the data packets (dp). Subsequently, the phase difference ($\Delta\phi$) between the transmitted tone signal (ts) and the generated tone signal (ts') is ascertained, before beginning the insertion of the generated tone signal (ts') in the data packets (dp), and compared to a predetermined phase difference ($\phi v$). If the ascertained phase difference exceeds the predetermined phase difference ($\Delta\phi, \phi v$), the phase of the generated tone signal (ts') is changed by a predetermined phase ($\phi$) with the aid of the tone generator (TG). The ascertainment of the phase differences ($\Delta\phi$) and the change of the phase ($\phi$) of the generated tone signal (ts') is repeated until the ascertained phase difference is less than the predetermined phase difference ($\Delta\phi, \phi v$), upon which instead of the transmitted tone signal (ts), the generated tone signal (ts) is inserted into the data packets (dp). A substantial advantage of the invention can be seen in that a phase detector does not have to be continuously active for the synchronization, but rather the synchronization must only be performed if a tone signal (ts) or tone information (ti) is received and the insertion of the generated tone signal (ts') is imminent.

9 Claims, 1 Drawing Sheet

(51) Int. Cl.
*H04L 29/06* (2006.01)
*H04N 1/00* (2006.01)

(56) References Cited

FOREIGN PATENT DOCUMENTS

| WO | 01/28256 | A1 | 4/2001 |
|---|---|---|---|
| WO | 02089448 | A2 | 11/2002 |

OTHER PUBLICATIONS

International Search Report for PCT/EP2008/066984 dated Apr. 20, 2009 (Form PCT/ISA/210).
Written Opinion of the International Searching Authority for PCT/EP2008/066984 dated Apr. 20, 2009 (Form PCT/ISA/237).
International Preliminary Report on Patentability for PCT/EP2008/066984 (Form PCT/IB/373 and PCT/ISA/237) (German).
International Preliminary Report on Patentability for PCT/EP2008/066984 (Form PCT/IB/373 and PCT/ISA/237) (English Translation).

METHOD AND RECEIVING UNIT FOR SYNCHRONIZING A PACKET-ORIENTED RECEPTION WITH A CALCULATED TONE SIGNAL

CROSS-REFERENCE TO RELATED APPLICATIONS

This application is the United States national phase under 35 U.S.C. §371 of PCT International Application No. PCT/EP2008/066984, filed on Dec. 8, 2008, and claiming priority to German Application No. 10 2007 061 312.3. Both applications are incorporated by reference herein.

BACKGROUND OF THE INVENTION

1. Field of the Invention

Embodiments of the invention are in the field of improvement of transmission of audio information. Particular embodiments are in the field of improvement of transmission of tone signals according to RFC standard 2833.

2. Background of the Art

In communication networks, and especially in Voice over IP communication networks, compression methods—according to ITU standard G.729, for example—are used for transmitting speech and tones or tone signals, wherein the compression concepts used are best suited for speech transmission. When transmitting multi-frequency tones—known in the industry as DTMF dial tones—or fax/modem signaling tones, under certain circumstances the compression process can cause undesired changes in certain features of the digitized tones. In order to avoid such problems and facilitate tone recognition in the counterpart device, a standardized method according to RFC 2833 can be used to transmit fax/modem signaling tones, wherein this method is configured for transmitting tone signals that are used for signaling that creates a communication connection between Voice over IP terminals.

For example, when transmitting a fax/modem tone signal at 2100 Hz according to RFC 2833, the sending side recognizes and suppresses an incoming fax/modem tone signal or a digitized or analog tone signal. At the same time, a piece of tone information is generated in place of the recognized fax/modem tone signal and, in the case of a Voice over IP transmission, is inserted into special RTP (Real Time Protocol) data packets which are then sent over the Internet or over networks with Internet protocol. The tone information according to RFC 2833 contains data about the tone type, level, and duration of the fax/modem tone signal. On the receiving side, after the transmitted tone information is measured using a tone generator, the fax/modem tone signal is reproduced and inserted into the decoded signal from the RTP data packets. Because a time span of typically 20-30 ms is required for recognition of the transmitted fax/modem tone signals, it is not possible to suppress the portions or bit patterns of a fax/modem tone signal transmitted up to that point and transmit them further without an additional undesired delay. On the receiving side, when converting between the fax/modem tone signal produced in the tone generator and reinserted and the unsuppressed bit pattern of the fax/modem tone signal, there can be signal processes that a downstream tone detector may misinterpret as a phase reversal or phase shift or as amplitude modulation. These misinterpretations can occur especially in scenarios where a fax/modem tone signal is transmitted through multiple networks with Internet protocol or there are multiple transfers of the fax/modem tone signal according to RFC 2833. Misinterpretations often lead to significant problems or to complete failure when transmitting a fax/modem tone signal using data packets or RTP data packets.

BRIEF SUMMARY OF THE INVENTION

In one embodiment the invented method includes a number of features:
a) the tone signal is inserted into data packets on the sending side,
b) the tone signal is also transmitted in special data packets by the sending side, using a piece of tone-signal-specific tone information,
c) a tone generator on the receiving side generates a tone signal according to the transmitted tone information,
d) the phase difference between the transmitted and generated tone signals is ascertained before the generated tone is inserted into the data packets and is compared with a predefined phase difference,
e) if the ascertained phase difference exceeds the predefined phase difference, the tone generator is used to shift the phase of the generated tone by a predefined phase value, and
f) steps d) and e) are repeated until the ascertained phase difference lies under the predefined phase difference, at which point the generated tone signal is inserted into the data packets in place of the transmitted tone signal.

An important advantage of an embodiment of the invention lies in the fact that a phase detector does not have to be constantly active for synchronizing the phase of the tone signal produced in the tone generator, because synchronization is necessary only when a tone signal or piece of tone information is received and insertion of the tone signal is imminent.

According to a further embodiment of the invention:
g) the last two transferred bit patterns of the transmitted tone signal that are produced before the preset time when the generated tone signal is inserted into the data packets are stored,
h) a first phase difference between the last stored bit pattern and the currently produced bit pattern of the generated tone signal is ascertained,
i) a second phase difference between the previous stored bit pattern and the currently produced previous bit pattern of the generated tone signal is ascertained,
j) the ascertained first and second phase differences are compared with a predefined phase difference,
k) if the ascertained first and second phase differences exceed the predefined phase difference, the tone generator is used to shift the phase of the generated tone by a predefined phase value, and
l) steps g) through k) are repeated until the first or second ascertained phase difference is less than the predefined phase difference.

An advantage of this embodiment of the invention lies in the fact that only two bit patterns or scanning patterns—also known as "samples" in the industry—can be stored at a time, which permits short processing times for the synchronization process.

BRIEF DESCRIPTION OF THE FIGURES

The invention and further examples of it are explained below with reference to two drawings, which contain.

DETAILED DESCRIPTION OF THE INVENTION

Figure 1:
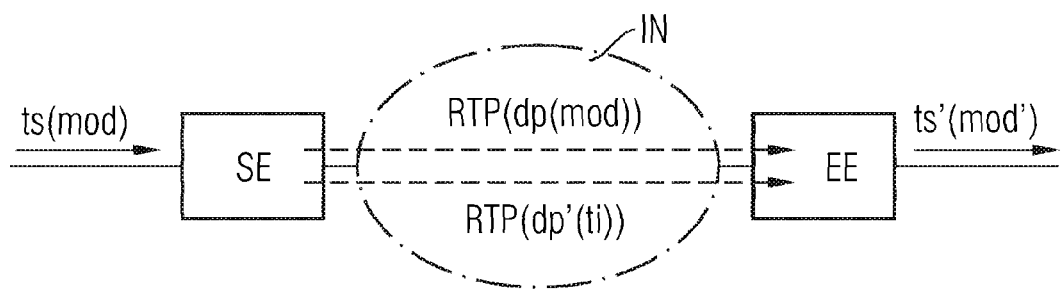
FIG. 1 a block schematic diagram of a communication arrangement in which the invented method is used, and FIG. 2 a second block schematic diagram of an arrangement for using the invented method in a receiving unit according to FIG. 1.

FIG. 1 shows a sending and a receiving unit SE and EE on which communication connections can be established over the Internet IN. The sending and receiving units SE, EE can consist of gateways, for example, which can be used to transmit speech information and signaling information over the Internet IN through a communication connection, which in the execution example is a Voice over IP connection.

For the execution example it is assumed that the data packets dp consist of Voice over IP data packets dp that are transmitted by the sending unit SE over the Internet IN—which alternatively can be a local network with Internet protocol—to the receiving unit EE. For the execution example it is further assumed that the data packets dp are transmitted according to the RTP (Real Time Protocol). The RTP is defined in RFC standard 1889 or 3550 and is a protocol for continuous transmission of real-time data such as audiovisual or multimedia data over IP-based networks.

In addition to the user information transmitted in the data packets dp—such as speech information in Voice over IP data packets—introduced tone signals ts, such as DTMF tone signals or fax/modem tone signals, should also be transmitted to the sending unit SE. The currently existing compression processes are best suited for compression of speech signals in particular. When compressing tone signals ts, not all tone features are transmitted unchanged. To avoid this disadvantage and to facilitate recognition of tones in the receiving unit, a process according to RFC standard 2833 should be used. The following explains the invented method as used to transmit a fax/modem tone signal, wherein a modem tone signal is represented by the example of a 2100 Hz tone signal, which is used to switch off the echo canceller that is provided for speech transmission, in order to create a transmission channel in data transmission mode.

According to the standard, the sending side examines the signals that are to be transmitted to see if there are tone signals, i.e., a fax/modem tone signal mod, and if one is recognized, transmission of the fax/modem tone signal mod is suppressed. This means that no data packet dp with a recognized fax/modem tone signal is sent out. When the fax/modem signal is recognized, its characteristics such as frequency, level, and tone type are also recognized and are placed into a piece of tone information ti. Instead of the recognized fax/modem signal, a separate data packet dp' containing the tone information ti is transmitted. According to standard RFC 2833, after the tone information ti is received, the sending side uses a tone generator TG (see FIG. 2) to recreate the fax/modem signal mod according to the tone information ti—frequency, level, tone type—and inserts it into the data stream in data packets dp using an insertion/reading unit ELE (see FIG. 2).

In the procedure according to the standard, time is needed to recognize a tone signal ts or a fax/modem signal mod—usually 20-30 ms. During this time, the sending side inserts the fax/modem signal mod into data packets dp, before suppression of the fax/modem signal takes effect. The tone information ti is also transmitted in a separate data packet dp. On the receiving side then, when the signal produced by the tone generator TG is inserted, there can be a phase shift or phase reversal of the fax/modem signal mod that is not suppressed at the right time. This phase shift can lead to significant problems in downstream tone detectors. The invented method is especially well suited to preventing these problems.

According to an embodiment of the invention, a tone signal ts or fax/modem signal mod is no longer suppressed after it is recognized by the sending side, but rather is retransmitted, as designated in FIG. 1 by an arrow marked dp (mod). In addition, according to standard RFC 2833, the parameters of the recognized fax/modem signal mod, such as its tone type, level, and frequency, are taken from it, placed into a piece of tone information ti, and inserted into a separate data packet dp, designated in FIG. 1 by an arrow marked dp' (mod).

Figure 2:
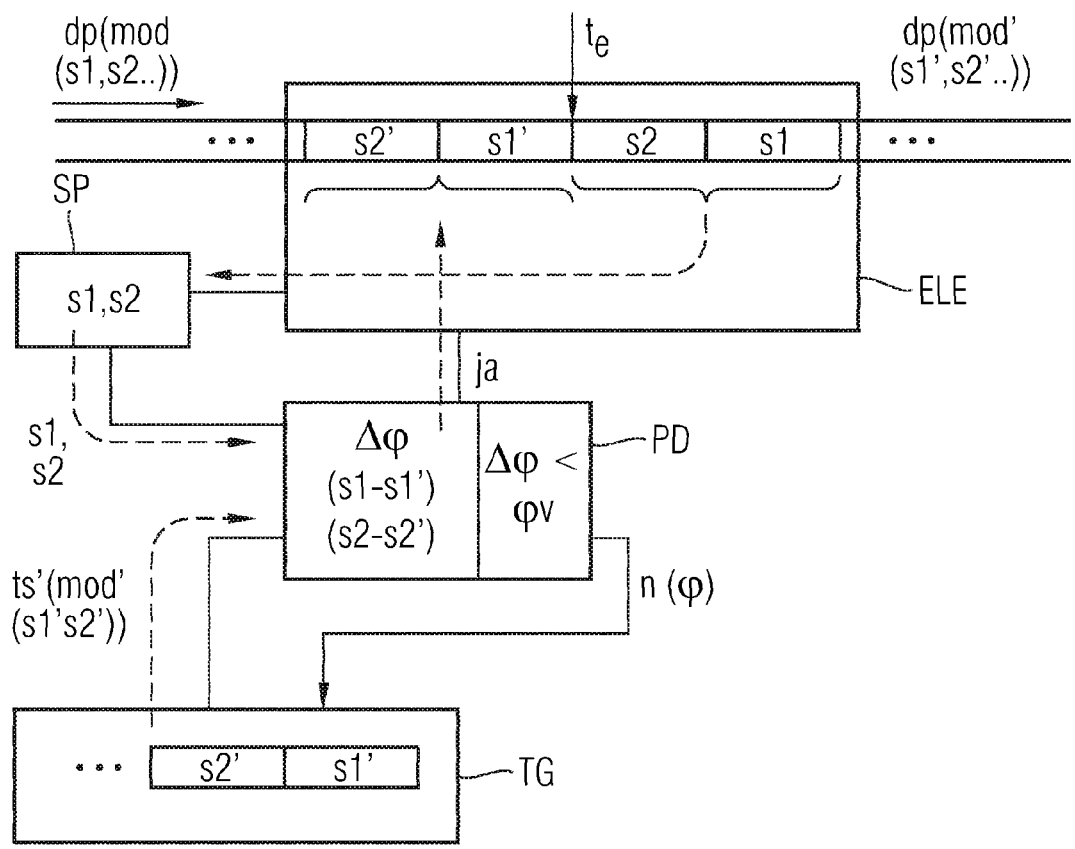

FIG. 2 shows a possible arrangement for executing an embodiment of the invented method in the receiving unit EE. With an insertion/reading unit ELE, to which data packets dp are transmitted by the sending unit SE, the tone information ti from the separate data packet dp' is read and sent on to the tone generator TG, in which the fax/modem signal mod' is then produced. The fax/modem signal mod' is created using individual bit patterns s—also known in the industry as samples—and these bit patterns s, instead of the transmitted fax/modem signal mod, are inserted into the bit pattern stream of the data packets dp at a predefined point in time $t_e$.

Because the bit pattern s produced by the tone generator TG must be inserted with little or no phase shift, the phase relationship of the bit pattern s is ascertained for the fax/modem signal mod sent before time $t_e$. To do this, a first and second bit pattern s1, s2 transmitted before time $t_x$ are read by the insertion/reading unit ELE and stored in a memory SP. From the memory SP, the two bit patterns s1, s2 are read by a phase detector PD, and their phase relationships are compared with two bit patterns s1', s2' that were produced by the tone generator TG and are to be inserted into the data packets dp at time $t_x$. In the phase detector PD, the phase differences $\Delta\phi$ of the first bit patterns s1, s1' and the second bit patterns s2, s2' are ascertained and then compared with a predefined phase difference $\phi v$. The predefined phase difference $\phi v$ is the maximum phase difference that can exist between the transmitted fax/modem signal mod and the fax/modem signal mod' produced in the tone generator TG, or that can be tolerated in order to prevent problems with downstream tone detectors.

For this execution example it is assumed that the phase difference $\Delta\phi$ is greater than the predefined phase difference $\phi v$ and therefore, in order to prevent too high of a phase shift, the two bit patterns s1', s2' produced by the tone generator TG, as well as subsequent bit patterns, cannot be inserted into the data packets dp at time $te_x$.

According to the invention, the phase of the bit patterns s' produced by the tone generator TG or of the fax/modem signal mod' is changed or shifted to a predefined phase $\phi$. The predefined phase $\phi$ is selected such that a gradual change of the bit pattern s' produced by the tone generator TG to the predefined phase $\phi$ will achieve a result below the predefined phase difference $\Delta\phi$ without causing another phase reversal.

Next a later insertion time $t_e$ is set, and the next two bit patterns s transmitted before the insertion time $t_e$ are read by the insertion/reading unit ELE and stored in the memory SP (not shown in the figure). The two bit patterns s' produced by the tone generator TG before a later insertion time $t_e$ are used for the phase comparison with the stored bit patterns s. If the phase difference ascertained is beyond the predefined phase difference $\Delta\phi$, the steps in the method described above for changing each bit pattern s' produced by the tone generator TG to the predefined phase $\phi$ are repeated until the phase difference $\Delta\phi$ is smaller than the predefined phase difference $\phi v$; these repeated processes are not shown in the figure.

When the phase detector determines that the phase difference $\Delta\phi$ is smaller than the predefined phase difference $\phi\Delta$, then at insertion time $t_e$, instead of the bit patterns s1, s2 for the transmitted fax/modem signal mod, the bit patterns s1', s2' and additional bit patterns s' for the fax/modem signal mod' produced in the tone generator TG are inserted in the data packets dp using the insertion/reading unit ELE. For clarity, the figure shows only the variation in which the phase difference $\Delta\phi$ is smaller than the predefined phase difference $\phi v$ after just one comparison, so the bit patterns s1', s2', etc. produced in the tone generator TG can be inserted immediately at insertion time $t_e$ into the data packets dp.

If there are no additional steps according to an Internet protocol, then the bit patterns s1, s2, etc. or the fax/modem signal mod' can be transmitted to other protocols or converted to an analog fax/modem signal mod'.

Embodiments of the invented method are not limited to the execution example, but can be used in all sending and receiving units through which tone signals are sent according to RFC standard 2833 or similar processes.

The invention claimed is:

1. A method for synchronizing a tone signal transmitted in data packets comprising:
   a) inserting a tone signal into transmitted data packets wherein the tone signal is transmitted by tone-signal specific information in the data packets;
   b) generating a tone signal according to the transmitted tone information using a tone generator;
   c) ascertaining a phase difference between the transmitted tone signal and the generated tone signal before insertion of the generated tone signal into the data packets begins and comparing the ascertained phase difference to a predefined phase difference;
   d) upon a determination that the ascertained phase difference exceeds the predefined phase difference changing the phase of the generated tone signal by the tone generator to a predefined phase; and
   e) repeating steps c) and d) until the ascertained phase difference lies under the predefined phase difference then inserting the generated tone signal into the data packets in place of the transmitted tone signal.

2. The method of claim 1, comprising:
   f) storing a last two transmitted bit patterns of the transmitted tone signal that were produced before a predefined insertion time of the generated tone signal into the data packets; and
   g) ascertaining a last stored bit phase difference between a last stored bit pattern and a last bit pattern for the generated tone signal produced before the insertion time;
   h) ascertaining a previously stored bit pattern phase difference between the previously stored bit pattern and the previous bit pattern for the generated tone signal produced before the insertion time;
   i) comparing the last stored bit phase difference and the previously stored bit pattern phase difference with the predefined phase difference;
   j) upon a determination that the last stored bit phase difference and the previously stored bit pattern phase difference exceed the predefined phase difference shifting a phase of the generated tone signal by a predefined phase value using the tone generator; and
   k) repeating steps f) through j) until at least one of the last stored bit phase difference and the previously stored bit pattern phase difference lies below the predefined phase difference.

3. The method of claim 2, wherein the comparing of the last stored bit phase difference and the previously stored bit pattern phase difference occurs prior to a comparison of other bit phase differences.

4. The method of claim 1, comprising producing and transmitting the transmitted tone information according to Request for Comments (RFC) standard 2833.

5. The method of claim 1, comprising producing and transmitting the data packets with the Real-Time Transport Protocol (RTP) according to Request for Comments (RFC) standard 3511.

6. The method of claim 1, wherein the transmitted tone signal is a fax signal or a modem signal.

7. Receiving equipment for synchronizing a tone signal transmitted in data packets comprising:
   a) a receiving unit for receiving a transmitted tone signal inserted in data packets and for receiving a piece of tone-signal specific tone information transmitted in the data packets;
   b) a tone generator for generating a generated tone signal produced according to said tone information and having a phase;
   c) a phase detector for ascertaining a phase difference between the transmitted tone signal and the generated tone signal before insertion of the generated tone signal into the data packets begins, and for comparison with a predefined phase difference;
   wherein the tone generator is configured such that, upon a determination that an ascertained phase difference exceeds the predefined phase difference the phase of the generated tone signal is shifted by a predefined phase; and
   wherein the receiving equipment is configured such that ascertaining the phase difference and configuring the tone generator to shift the generated tone signal by the predefined phase are repeated until the ascertained phase difference lies under the predefined phase difference, the generated tone signal being inserted in the data packets in place of the transmitted tone signal upon the ascertain phase difference being under the predefined phase difference.

8. The receiving equipment of claim 7, wherein the ascertained phase difference is a first ascertained phase difference and the receiving equipment further comprising:
   d) an insertion/reading unit and a memory for storing a last two transmitted bit patterns of the transmitted tone signal that were produced before a preset insertion time for inserting the generated tone signal in the data packets
   e) a phase detector for ascertaining a second phase difference between a last stored bit pattern and a last bit pattern produced from the generated tone signal before the insertion time, and
      for ascertaining a third phase difference between a previous stored bit pattern and a previous bit pattern produced before the insertion time, and
      for comparing the ascertained second and third phase differences with the predefined phase difference; and
   wherein the tone generator is configured such that, if the ascertained second and third phase differences exceed the predefined phase difference, the phase of the generated tone signal is shifted by a predefined phase value; and wherein the insertion/reading unit, the memory, the phase detector, and the tone generator are configured such that ascertainment of the second and third phase differences and shifting of the phase of the generated tone signal are repeated until the ascertained second phase difference or the ascertained third phase difference lies under the predefined phase difference.

9. Receiving equipment of claim 8, wherein the piece of tone-signal specific tone information is generated according to RFC standard 2833 is received.

* * * * *